United States Patent [19]

Barfield

[11] Patent Number: 5,096,632
[45] Date of Patent: Mar. 17, 1992

[54] METHOD OF MANUFACTURING AN ELECTROFUSION COUPLER

[75] Inventor: Malcolm R. Barfield, Willenhall, England

[73] Assignee: Glynwed Tubes & Fittings Limited, Staffordshire, United Kingdom

[21] Appl. No.: 498,416

[22] Filed: Mar. 23, 1990

Related U.S. Application Data

[62] Division of Ser. No. 231,343, Aug. 12, 1988, Pat. No. 4,956,138.

[30] Foreign Application Priority Data

Aug. 17, 1987 [GB] United Kingdom ............... 8719430

[51] Int. Cl.$^5$ .................... B29C 45/14; B29C 45/16
[52] U.S. Cl. .................... 264/27; 264/135; 264/255; 264/272.18; 264/310
[58] Field of Search .............. 264/272.18, 272.19, 264/135, 255, 27, 310; 29/611

[56] References Cited

U.S. PATENT DOCUMENTS

| | | | |
|---|---|---|---|
| 3,520,053 | 7/1970 | Hinton et al. | 29/611 |
| 4,495,130 | 1/1985 | Hedrick | 264/255 |
| 4,725,395 | 2/1988 | Gasparaitis et al. | 264/272.19 |
| 4,797,993 | 1/1989 | Kenworthy et al. | 264/272.18 |

FOREIGN PATENT DOCUMENTS

2137710 10/1984 United Kingdom ........... 264/272.18

Primary Examiner—James Lowe
Attorney, Agent, or Firm—Clifford A. Poff

[57] ABSTRACT

A method is disclosed for the manufacture of an electrofusion coupler, for connecting adjoining lengths of thermoplastics pipes, and which coupler takes the form of a sleeve of thermoplastics material, to receive adjoining ends of adjoining pipes, the sleeve having an electrical resistance heater embedded therein and extended around the sleeve. In the method, a plastics preform is wound with a resistance heating wire, while heating the wire, to melt the surface of the preform, or applying molten plastics to the preform in the vicinity where the wire runs onto the preform, in order to ensure that the heating wire is fully embedded in the preform. A pressing roller may be run over the preform surface before the molten plastics has solidified, in order to smooth over the molten plastics. The preform 10 is subsequently placed in an injection mould and an outer encapsulating jacket is injection moulded around the preform.

10 Claims, 4 Drawing Sheets

METHOD OF MANUFACTURING AN ELECTROFUSION COUPLER

This is a divisional application of co-pending application Ser. No. 231,343, filed on Aug. 12, 1988, now U.S. Pat. No. 4,956,138, Sept. 11, 1990.

BACKGROUND OF THE INVENTION

This invention relates to a method of manufacturing an electrofusion coupler for use in the construction of thermoplastics pipe systems wherein a welded joint between adjoining ends of adjoining sections of plastics pipe, or of such a pipe section and a tubular member forming part of the pipe fitting, valve or the like, is obtained by inserting such adjoining ends into such an electrofusion coupler and energising the same.

Such an electrofusion coupler may take the form of a sleeve of thermoplastics material having an electrical resistance heater embedded therein and extended around the sleeve. When adjoining pipe ends or the like are inserted into the sleeve from opposite ends and the resistance heating wire, and thus the sleeve, is subsequently heated by passing an electric current through the wire, both the material of the sleeve and the material of the inserted pipe ends or the like are locally softened and fused, whereby an intimate connection is obtained, in the form of a welded join which, when the assembly has cooled, is leak tight to fluids. The coupler remains in situ forming a permanent part of the joint.

Typically, the electrical resistance wire takes the form of coil embedded in the thermoplastics sleeve and coaxial therewith, the wire lying close to the inner surface of the sleeve, the ends of the wire being connected to terminal points, exposed on the exterior of the sleeve for connection to a source of electrical current.

British Patent No. 2,090,558 discloses a method of manufacturing an electrofusion coupler of the above-noted character in which a tubular thermoplastics preform, destined to form the radially inner part of the electrofusion coupler, is first formed by injection moulding and is subsequently mounted on a rotatable winding mandrel by means of which the preform is rotated about its axis to wind on its outer surface a helical winding of electrical resistance heating wire fed thereto by a guide. The guide incorporates a heater by means of which the wire is heated electrically as it is wound on the preform so that as it is wound on it melts the outer surface of the preform when it touches the same and thus becomes at least partially embedded in the preform. The wire guide incorporates an electrical heater which heats the wire as it passes therethrough onto the preform. The preform is provided with terminal pegs at either end, the free end of the wire being attached to the terminal peg at one end before winding commences and the wire being attached at its other end to the other terminal peg after winding. The wound preform is then inserted within a mould in which an outer encapsulating jacket of thermoplastics material is injection moulded therearound, becoming united with the preform, the now integral preform and encapsulating jacket forming the finished electrofusion coupler.

It is among the objects of the present invention to provide an improvement over the method of U.S. Pat. No. 2,090,588 which provides improved and more reliable location of successive turns of the winding on the preform prior to the moulding of the outer, encapsulating jacket.

The term "electrofusion coupler" as used herein is intended to extend, not only to simple tubular couplers intended to connect two pipe sections end to end, in axial alignment, but also to any other fitting which serves to connect two or more pipes together, such as elbows, tee connections, tapping saddles, branch connections, etc.

Accordingly it is an object of the invention to provide an improved electrofusion coupler of any type falling within the above definition.

According to one aspect of the invention, there is provided a method of forming an electrofusion coupler, as herein defined, comprising forming a preform of thermoplastics material, applying thereto an electrical resistance heating wire and ensuring that the heating wire is fully embedded in the preform before placing the preform in an injecton mould and moulding, over the preform, in thermoplastics material, an outer encapsulating jacket.

According to another aspect of the invention there is provided a method of forming an electrofusion coupler comprising forming a tubular preform of thermoplastics material, winding thereon an electrical resistance heating wire and ensuring that the heating wire is fully embedded in the preform before placing the wound preform, in an injection mould and moulding, around the preform, in thermoplastics material, an outer encapsulating jacket.

According to a yet further aspect of the invention, there is provided a method of forming an electrofusion coupler, as herein defined, comprising applying a heating wire to the surface of a support member and simultaneously or subsequently applying molten thermoplastics material to the support member to cover the applied wire, whereby the thermoplastics material will solidify on the support member, and subsequently stripping off from the support member a product formed by said thermoplastics material and having said heating wire embedded therein.

According to a still further aspect of the invention, there is provided a method of forming an electrofusion coupler comprising winding a heating wire around a mandrel and simultaneously or subsequently applying molten thermoplastics material to the mandrel to cover the wound-on wire, whereby the thermoplastics material will solidify on the mandrel, subsequently stripping off from the mandrel a tubular sleeve formed by said thermoplastics material and having said heating wire embedded therein, and subsequently moulding, around said sleeve, an encapsulating jacket of thermoplastics material.

BRIEF DESCRIPTION OF THE DRAWING

Embodiments of the invention are described below by way of example with reference to the accompanying drawings in which.

DESCRIPTION OF THE PREFERRED EMBODIMENTS

Figure 1:
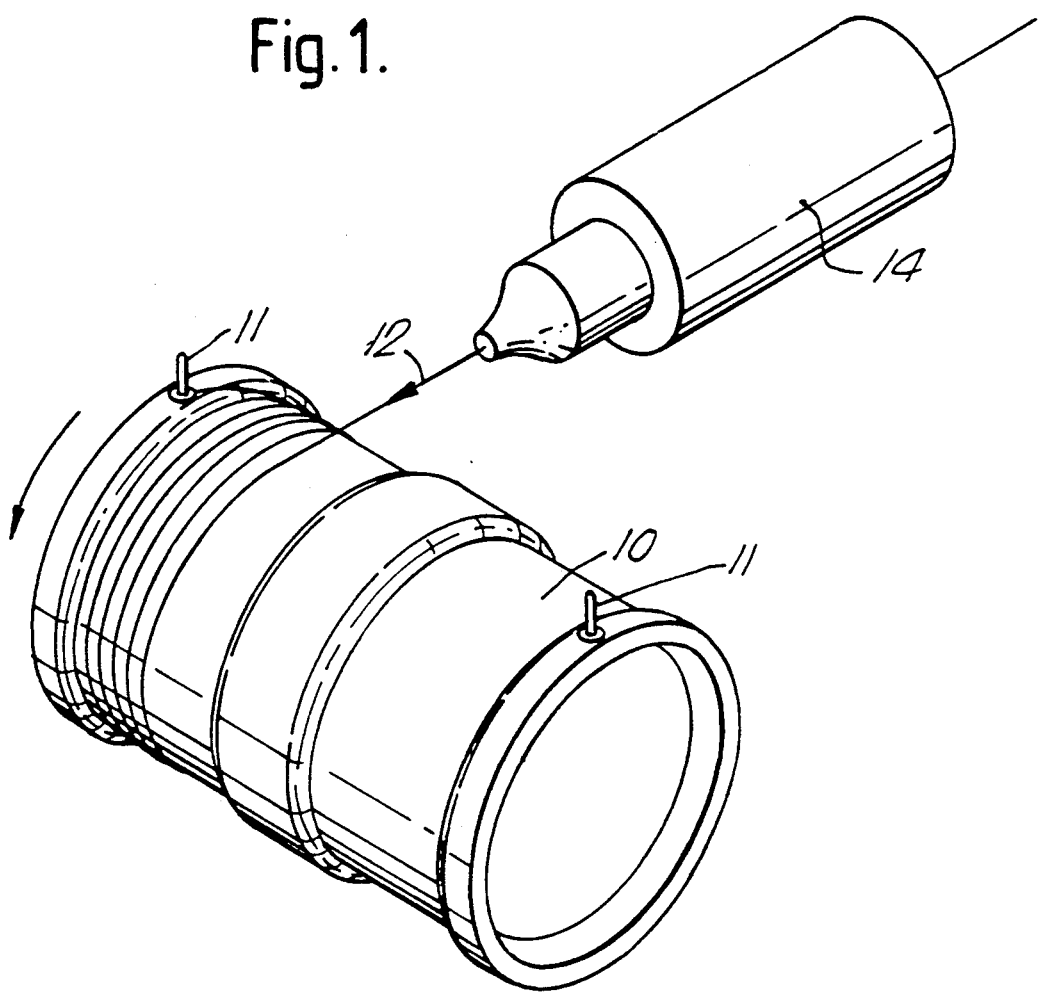
FIG. 1 is a schematic perspective view showing a known technique for winding a heating wire around a preform destined to form an inner part of an electrofusion coupler.

Referring to FIG. 1, there is illustrated schematically the winding of a tubular thermoplastics preform 10 with electrical resistance heating wire 12 in the method disclosed in British Patent No. 2,090,558. The preform 10 is mounted on a mandrel (not shown) for rotation about the axis of the preform, coupled with axial advancement of the preform whereby the wire 12, led to the rotating preform from a source (such as a storage reel—not shown) is wound around the preform 10 in a substantially helical winding. The wire 12 is heated before it reaches the preform by passing through a passage formed through a combined heating unit and guide 14 and a degree of tension is maintained in the wire as it is wound on so that the wire 12, as it is wound onto the preform, melts or softens the surface of the latter slightly whereby the wire, as it is wound on, becomes partially embedded in the surface of the preform, with a view to locating successive turns of the winding in position during the subsequent injection moulding of the outer encapsulating jacket. It will be noted that the preform 10 carries, at opposite ends; respective terminal pegs 11, the free end of the wire 12 being secured around one terminal peg 11 before winding commences, and the other end of the wire winding being secured around the other terminal peg 11 after winding has been completed.

Figure 5:
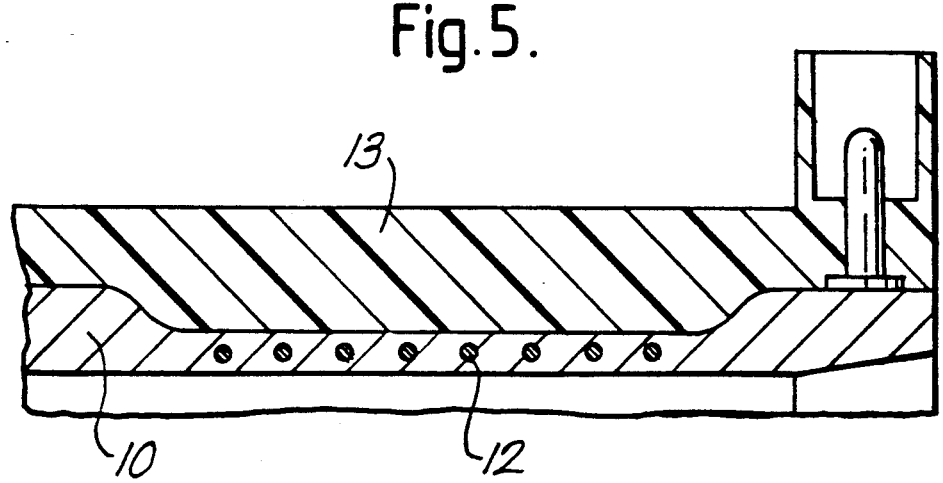
FIG. 5 is a fragmentary sectional view showing part of an electrofusion coupler manufactured by a method embodying the invention.
Figure 2A:
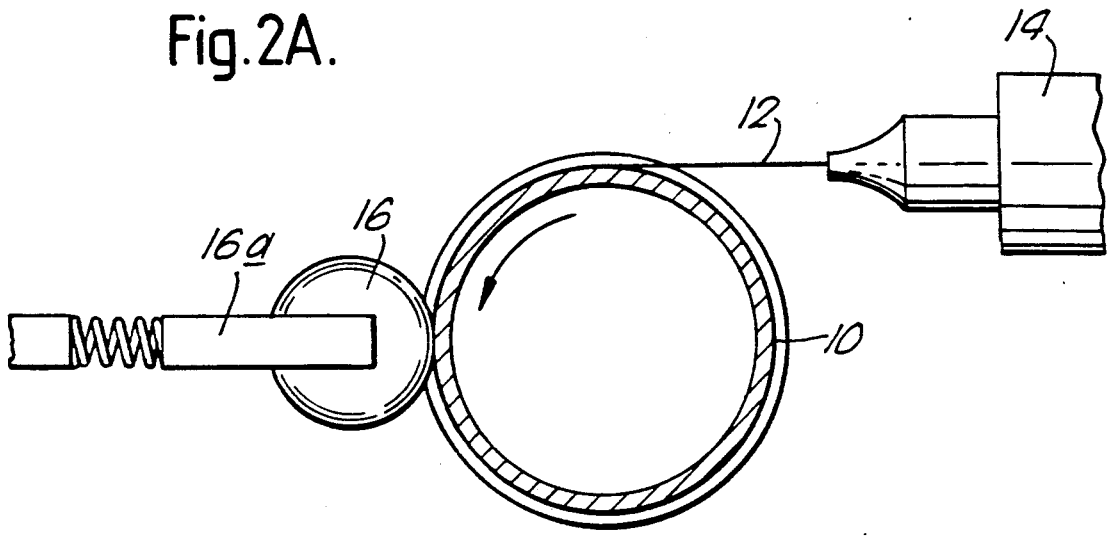
FIGS. 2A and 2B are schematic side elevation and plan views respectively illustrating a method embodying the invention for winding a heating wire around a preform.
Figure 2B:
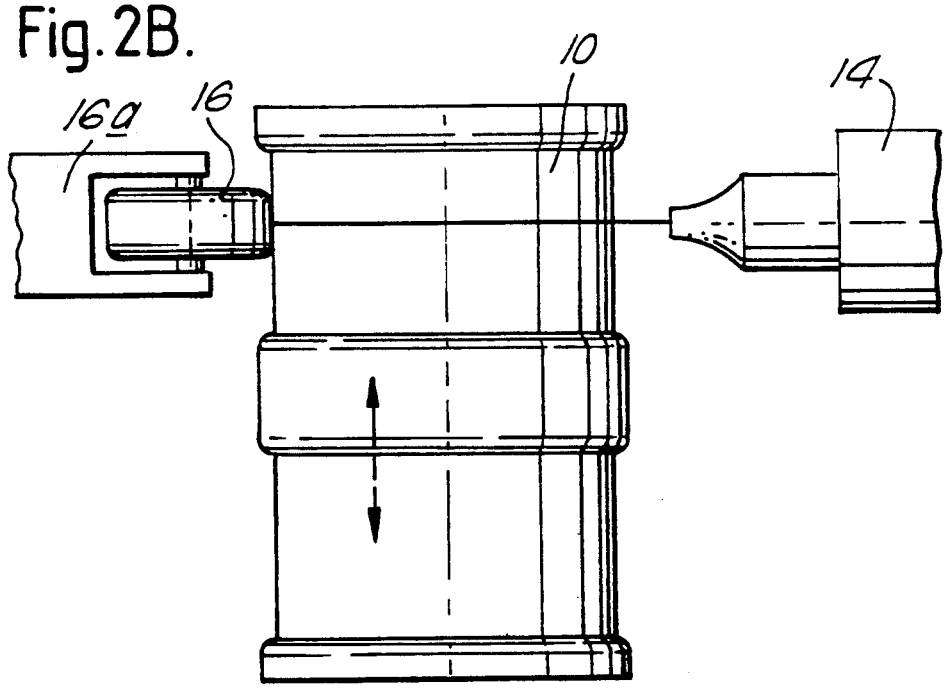

FIGS. 2A and 2B illustrate a variant, embodying the present invention, of the method of FIG. 1. In this variant, the wire 12, heated by the heater 14, is wound around the rotating preform 10 as before, but a forming tool, for example as illustrated, in the form of a roller 16, is pressed against the surface of the preform in the region of the most recently applied portion of the wire being wound on. In the example shown, the roller 16 is mounted for rotation in a carrier 16a which is in turn displaceable, radially with respect to the mandrel, in a guide which is stationary with respect to the heater 14. The carrier is urged towards the preform, to press the roller 16 against the preform, by the pressure of a biasing spring. The extent to which the wire is heated, the rotational rate of the preform 10 and the location of the roller 16 relative to the point at which the wire being wound on meets the preform are such that the plastics material of the preform in the immediate vicinity of the wound-on wire 12 is still molten or plasticised in the region upon which the roller 16 bears, with the result that the roller 16 forces the molten plastics material over the wound-on wire 12, thereby covering the latter entirely and reliably preventing subsequent displacement of the heated wire out of position. The wound-on wire 12 is then fully embedded in the preform, as illustrated in FIG. 5.

It will be appreciated that the spreading tool need not take the form of a roller but may, for example, take the form of a stationary shoe or the like. In either case, the spreading or forming tool is preferably coated with a non-stick material such as PTFE. The forming tool (e.g. roller 16) can be used cool or can be heated to assist in spreading the thermoplastics material. The means by which the forming tool (e.g. roller 16) is biased against the surface of the preform can take various forms, for example a biasing spring, a pneumatic or hydraulic biasing cylinder, gravitational force, etc.

Figure 3A:
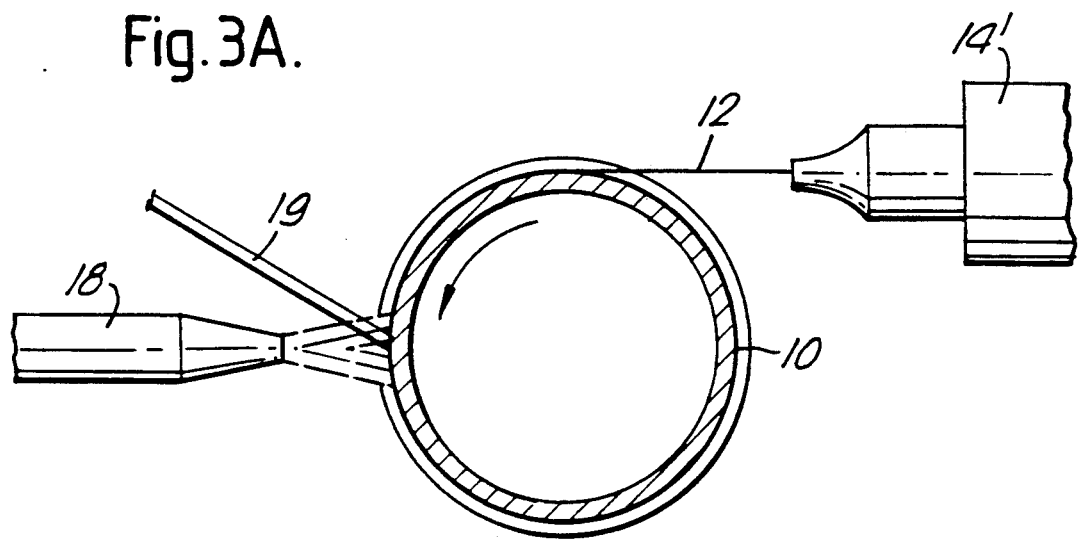
FIGS. 3A and 3B are views corresponding to FIGS. 2A and 2B but illustrating another method embodying the invention.
Figure 3B:
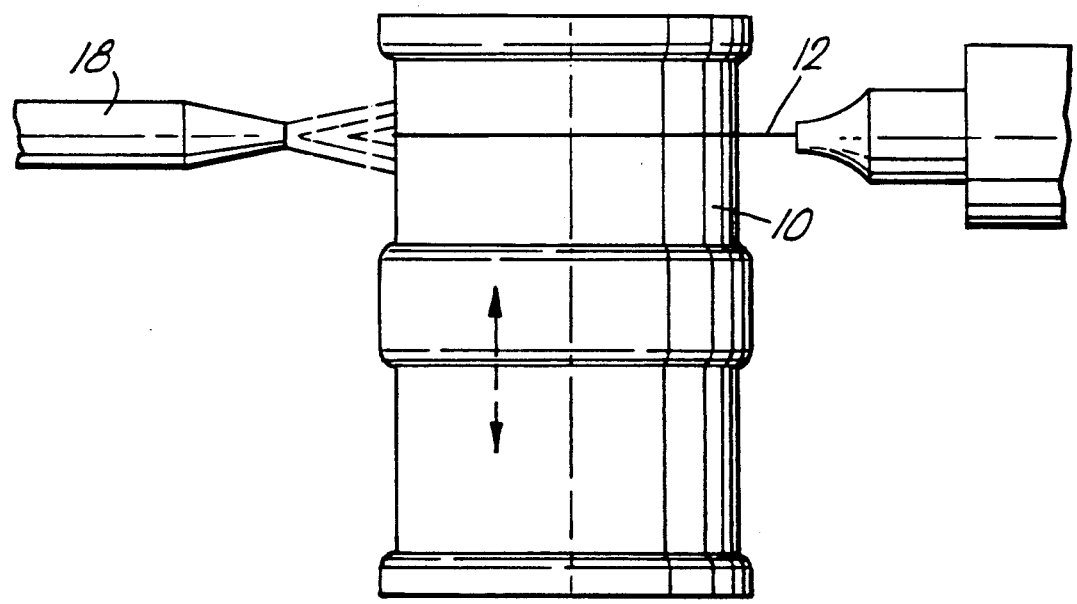

In the technique illustrated in FIGS. 3A and 3B, in which like parts have like reference numerals, as compared with FIGS. 2A and 2B, a thin layer of thermoplastics material is applied on top of the wire 12 wound onto the preform 10 by a welding technique which utilises an extrusion welder or which, as shown, utilises a welding gun 18 which directs towards the surface of the rotating preform a jet of hot gas, and a filler rod 19 of thermoplastics material which is fed automatically into the hot gas jet in the vicinity of the surface of the rotating preform to deposit molten plastics material on top of the wire 12 which has just been wound onto the preform. The welding gun 18, (or, in the alternative, the extrusion welder) like the roller 16 in FIGS. 2A and 2B, is mounted so as to be fixed with respect to the wire guide 14' which takes the place of or is constituted by, the combined wire guide and heater in the embodiment of FIGS. 2A and 2B. That is to say, it is not necessary, in the embodiment of FIGS. 3A and 3B, to heat the wire 12 before it is wound onto the preform, but it may nevertheless be preferable to do so.

A spreading or forming tool, such as a roller corresponding to the roller 16 in FIGS. 2A and 2B, may be arranged "downstream" of the welding gun in the arrangement of FIGS. 3A and 3B, (or of the extrusion welder, in the alternative), to spread the additional plastics material applied evenly over the preform.

Figure 4A:
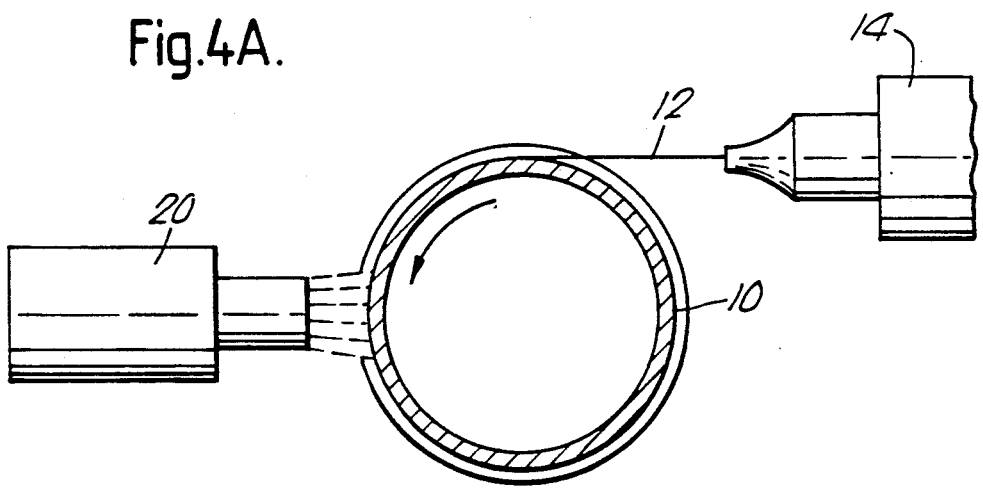
FIGS. 4A and 4B are views, corresponding to FIGS. 2A and 2B but illustrating yet another method embodying the invention.
Figure 4B:
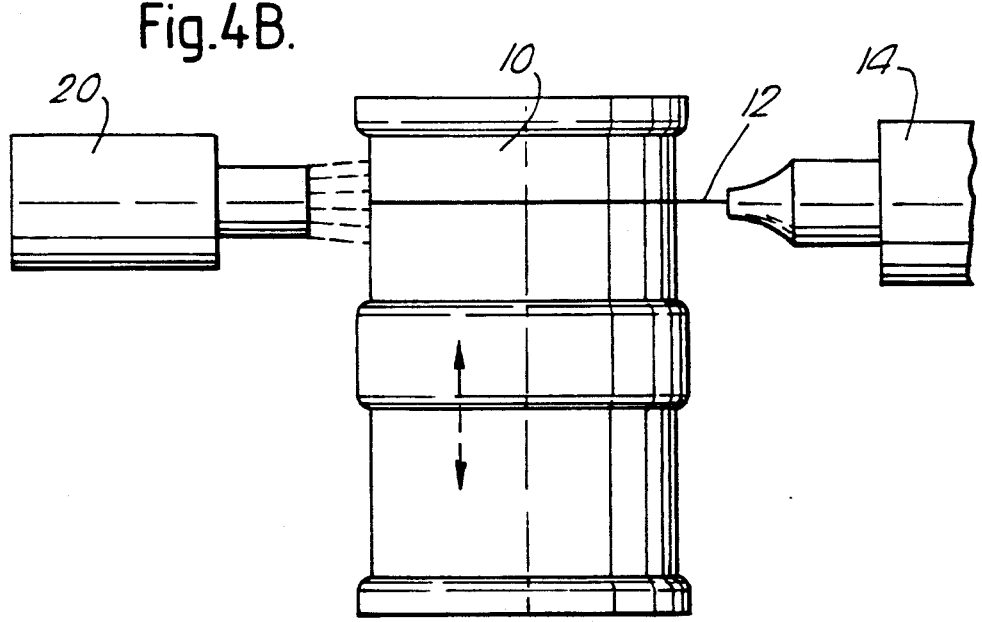

FIGS. 4A and 4B illustrate a further variant, in which the welding gun and filler rod of FIGS. 3A and 3B are replaced by a spray-coating device 20 which is arranged to apply to the surface of the rotating preform, over a region through which passes the wire 12 just wound on, a spray of molten thermoplastics material, which thus covers the wound-on wire 12 at the adjacent surface of the preform with a layer of thermoplastics material as the preform rotates and advances axially during winding on of the wire 20. The device 12 may be of known type in which thermoplastics material is introduced in powder form into a jet of hot gas directed towards the surface to be spray-coated.

In a variant of the method of FIGS. 4A and 4B, the heating wire is wound around the preform in the same manner as described with reference to FIG. 1, or even without heating of the wire, and the fully wire wound preform is subsequently spray coated with thermoplastics material, using a device such as the device 20, to produce an intermediate preform in which the wire 12 is fully embedded in the thermoplastics material, in the manner illustrated in FIG. 5, before the outer encapsulated jacket is moulded around the preform.

In a further variant, instead of utilizing an inner preform which has been formed by injection moulding, an inner sleeve of a thermofusion coupler may be formed by winding the heating wire 12 onto a suitably configured bare mandrel whilst the latter is rotated and advanced axially, and simultaneously, in a manner analogous with that described with reference to FIGS. 4A and 4B, spray-coating the mandrel and wound-on wire with plastics material as winding proceeds, so that at the end of this step the mandrel is encased in a tubular plastics sleeve in which the heating wire is embedded and which sleeve can readily be stripped off the mandrel for subsequent placement within a mould to provide the outer encapsulation.

In a further variant, the heating wire 12 is wound around the preform in substantially the manner described with reference to FIG. 1, except that the wire is wound cold (i.e. without heating in a heating unit such as unit 14), but under a predetermined tension. When the wire has been fully wound and secured at its ends to the respective terminal pegs 11, a predetermined heating current is then passed through the wound wire, from end to end, such as to melt the thermoplastics material of the preform in the immediate vicinity of the wire so that the latter is drawn by its pre-tensioning, radially inwardly into the thermoplastics material which "closes" behind the radially inwardly drawn wire, with the result that the wire becomes totally embedded as illustrated in FIG. 5.

It will be appreciated that, in the various embodiments described above, the preform, once the wire has been wound and embedded, is placed in an injection mould and the outer encapsulating jacket of thermoplastics material moulded therearound, by injection moulding, substantially as described in British Patent No. 2,090,558 and with reference to FIG. 1. In FIG. 5, the outer encapsulating jacket is indicated by the reference 13.

As noted above, the methods described with reference to FIGS. 2 to 4B may be adapted to electrofusion couplers taking the form of other types of fitting adapted to connect two or more pipes together, such as elbows, tee connections, tapping saddles, branch connections, etc. In instances, for example in the case of saddles, where a part of the fitting intended to be welded to a plastics pipe is not tubular, but, for example, merely arcuate, it may, of course, be necessary to resort to some technique other than straight-forward "winding" to apply the heating wire. Thus, for example, the preform, or the wire guide and means of applying additional plastics to the applied wire, or the preform and the wire guide etc., may be arranged to undergo a more complex movement so that, for instance, the wire is applied along a sinusoidal path.

I claim:

1. A method of forming an electrofusion coupler, comprising, as a separate operation from molding, applying a heating wire to the surface of a support member and simultaneously or subsequently applying molten thermoplastics material to the support member to cover the applied wire, allowing the thermoplastics material to solidify on the support member, and subsequently stripping off from the support member a product formed by said thermoplastics material and having said heating wire embedded therein and after the stripping off of said product from said support member, of molding over said product an outer layer of thermoplastics material.

2. A method of forming an electrofusion coupler comprising, as a separate operation from molding, winding a heating wire around a mandrel and simultaneously or subsequently applying molten thermoplastics material to the mandrel to cover the wound-on wire, allowing the thermoplastics material to solidify on the mandrel, subsequently stripping off from the mandrel a tubular sleeve formed by said thermoplastics material and having said heating wire embedded therein, and subsequently molding, around said sleeve, an encapsulating jacket of thermoplastics material.

3. A method of forming an electrofusion coupler comprising the steps of:
applying a heating wire to the surface of a support member along its length in the form of a number of spaced apart loops and simultaneously or subsequently applying molten thermoplastics material to the support member to completely cover each loop of the applied wire in a manner to prevent subsequent displacement thereof relative to the material, subsequently removing from said support member said thermoplastics material in a solidified condition having said heating wire covered thereby, and placing the wire covered with said material in an injection mold and molding, around the material, with other thermoplastics material, an outer encapsulating jacket.

4. A method according to claim 3, the additional steps of:
rotating said support member during said application of said heating wire to said support member,
presenting said wire during said application of said wire in a heated condition,
contacting the wound on wire by a pressure means to enhance said covering of the wire, and
controlling the extent to which the wire is heated, the rate of rotation of said support member and the point of contact of said pressure means relative to the point at which the wire being wound meets the plastics material so that the plastics material in the immediate vicinity of the wound on wire is still molten in the region upon which said pressure means contact the material.

5. A method according to claim 4, comprising the additional step of heating said pressure means sufficient to assist in the spreading of the plastics material.

6. A method according to claim 3, wherein said molten plastics material is applied by a welding operation.

7. A method according to claim 6, wherein said welding operation includes the steps of:
rotating said support member during said application of said heating wire to said support member,
wherein said welding operation include delivering weldable plastics material to said rotating support member, and
exposing said delivered plastics material to a hot gas in a manner to cause the material to be deposited as molten material on top of the wire which has been wound onto the support member.

8. A method according to claim 3, wherein said support member comprises a rotatable mandrel, the additional step of rotating said mandrel during said application of said heating wire to said mandrel.

9. A method according to claim 8, wherein said molten plastics material is applied by a spray coating operation, including the additional step of applying a spray of molten material to the surface of the rotating mandrel over the region through which the wire is immediately wound on the support member sufficient to completely cover the wound on wire.

10. A method according to claim 3, comprising the additional steps of:
rotating said support member during said application of said heating wire to said support member, and
heating the wire between the time prior to the wire being wound and when said molten plastics material is applied to said wire.

* * * * *